(12) United States Patent
Portman et al.

(10) Patent No.: US 11,675,842 B1
(45) Date of Patent: Jun. 13, 2023

(54) GENERATION OF RECOMMENDATION RESULTS USING A VERBAL QUERY

(71) Applicant: Amazon Technologies, Inc., Seattle, WA (US)

(72) Inventors: Leon Portman, Givatayim (IL); Liane Lewin-Eytan, Binyamina (IL); Mehul Jain, Redmond, WA (US); Stanislav Klyachkovsky, Haifa (IL); Eyal Itah, Hod HaSharon (IL)

(73) Assignee: Amazon Technologies, Inc., Seattle, WA (US)

( * ) Notice: Subject to any disclaimer, the term of this patent is extended or adjusted under 35 U.S.C. 154(b) by 581 days.

(21) Appl. No.: 16/780,354

(22) Filed: Feb. 3, 2020

(51) Int. Cl.
| | |
|---|---|
| *G06F 16/9032* | (2019.01) |
| *G06F 16/9535* | (2019.01) |
| *G06F 16/2457* | (2019.01) |
| *G06F 16/9538* | (2019.01) |
| *G10L 15/22* | (2006.01) |
| *G10L 15/18* | (2013.01) |
| *G06Q 30/0601* | (2023.01) |
| *G10L 15/08* | (2006.01) |
| *G06F 17/00* | (2019.01) |

(52) U.S. Cl.
CPC .. *G06F 16/90332* (2019.01); *G06F 16/24578* (2019.01); *G06F 16/9535* (2019.01); *G06F 16/9538* (2019.01); *G06Q 30/0625* (2013.01); *G10L 15/1815* (2013.01); *G10L 15/22* (2013.01); *G10L 2015/088* (2013.01); *G10L 2015/223* (2013.01)

(58) Field of Classification Search
CPC ......... G06F 16/90332; G06F 16/24578; G06F 16/9535; G06F 16/9538; G06Q 30/0625; G10L 15/1815; G10L 15/22; G10L 2015/088; G10L 2015/223
See application file for complete search history.

(56) References Cited

U.S. PATENT DOCUMENTS

| | | | |
|---|---|---|---|
| 9,953,637 B1 * | 4/2018 | Di Fabbrizio | .......... G10L 15/22 |
| 9,953,652 B1 * | 4/2018 | Rao | .................. G06F 16/24564 |
| 2012/0022867 A1 * | 1/2012 | Ballinger | ............. G10L 15/005 |
| | | | 704/235 |

* cited by examiner

*Primary Examiner* — Quoc A Tran
(74) *Attorney, Agent, or Firm* — Eversheds Sutherland (US) LLP

(57) ABSTRACT

Technologies are provided for generation of recommendation results using a verbal query. In one embodiment, query data can be generated using a searchable query corresponding to the verbal query. The query data can define a query browse node and a product brand, for example. First product identifiers that match the searchable query can be determined using multiple data repositories. Duplicates from the first product identifiers can be removed, resulting in second product identifiers. Attribute data also can be generated using the second product identifiers. The attribute data can define features for a product identifier. Further, third product identifiers can be determined by applying a filtering model to the second product identifiers. A ranking of the third product identifiers can be generated using an optimization function based on the query data and the product attribute data. A product corresponding to one of the ranked product identifiers represents a recommendation result.

19 Claims, 7 Drawing Sheets

GENERATION OF RECOMMENDATION RESULTS USING A VERBAL QUERY

BACKGROUND

A verbal query is an utterance that can convey a particular intent. An intelligent assistant device can receive the verbal query, and can utilize the particular intent to access specific data from a service platform. The intelligent assistant device can then provide a machine-generated response with the specific data. The machine-generated response can be provided as an audible signal, without additional visual information. Therefore, multiple candidate responses can be generated and ranked in order to select a defined candidate response representing the specific data.

Data sources commonly utilized to identify the candidate responses are rather limited. In addition, ranking models commonly applied to the candidate responses are generally inflexible. As a result, the quality of a response to a verbal query diminishes as the complexity of the verbal query increases. For instance, the relevancy of the response can diminish as the number of terms in the verbal query is greater than a few terms.

Therefore, improved technologies for generation of response to verbal queries may be desired.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
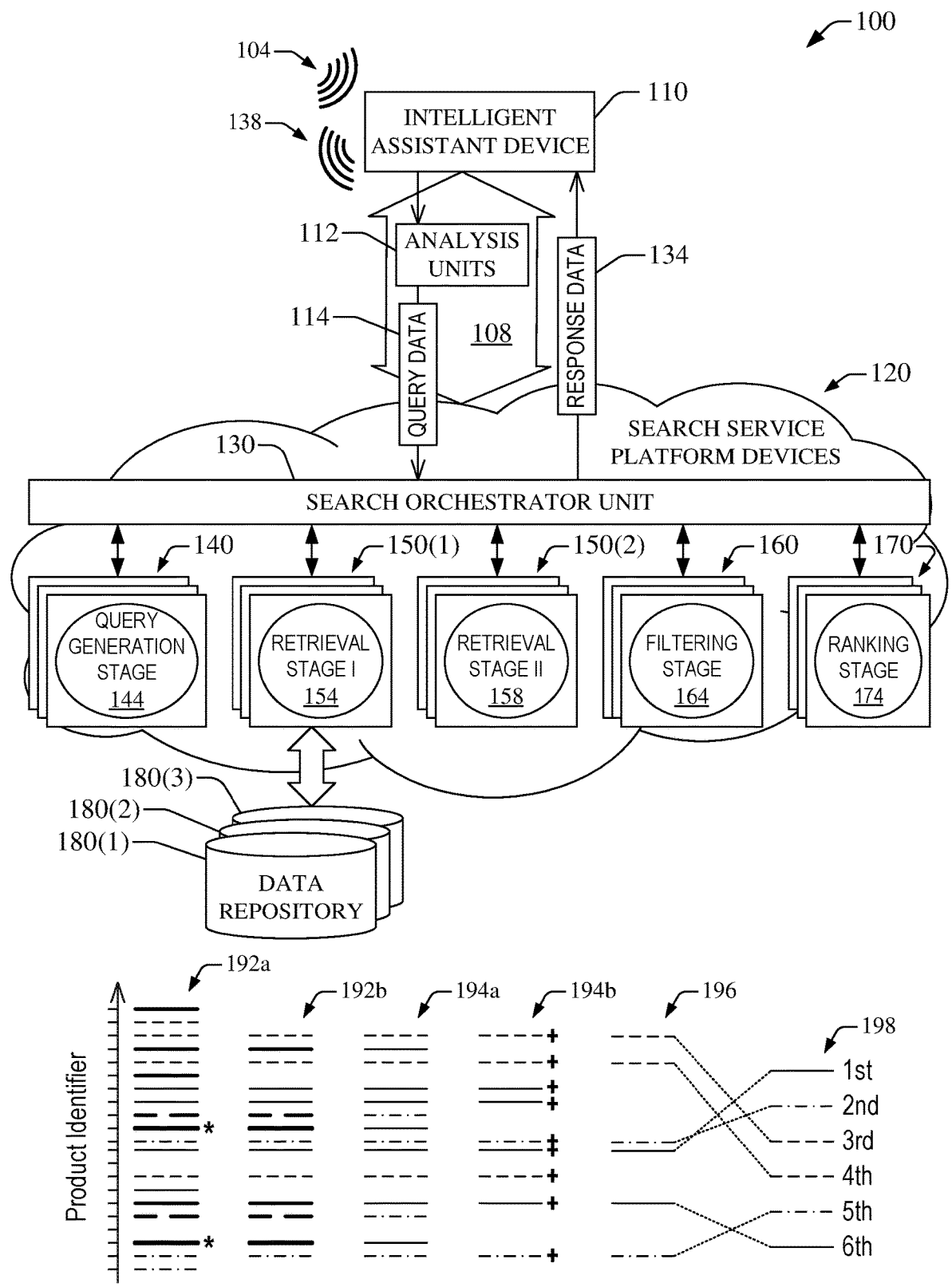
FIG. 1 illustrates an example of an operational environment for generation of recommendation results using verbal queries, in accordance with one or more embodiments of this disclosure.

The disclosure recognizes and addresses, amongst other technical challenges, the issue of generation of recommendation results using a verbal query. Embodiments of the disclosed technologies, individually or in combination, can be used for generation of recommendation results using a verbal query. One embodiment of the disclosed technologies includes a computing system that can receive data identifying the verbal query. The verbal query can convey a defined intent and can be received from an intelligent assistant device. The verbal query can be utilized to form a searchable query. To that end, the computing system can transform the received data into the searchable query by applying automated speech recognition (ASR) to generate a textual query. The computing system also can reformulate the textual query, resulting in the searchable query.

The searchable query also can be utilized to generate query signals defining parameters that can augment the searchable query in order to produce a more reliable ranking of candidate recommendation results. More specifically, the computing system can generate query data using the searchable query, where the query data can include first data defining one or multiple query browse nodes and second data defining a product brand. A query browse node refers to a category of products corresponding to the searchable query. For example, for a searchable query originating from a verbal query in the Books vertical experience, a query browse node can be Gardening Books.

The searchable query also can be utilized to perform a first retrieval stage that can yield first product identifiers that match the searchable query. The first retrieval stage is directed to collecting a wide variety of product identifiers that may be relevant to the searchable query. For instance, a product identifier can correspond to a product having a type that is pertinent to the searchable query, but also having other product attributes that may be less pertinent to the searchable query. As such, the computing system can identify, using one or more, or multiple, data repositories, those first product identifiers that match the searchable query. A first data repository of the multiple data repositories containing data corresponding to a catalog of a vertical experience, and a second data repository of the multiple data repository containing data corresponding to historical activity in a digital marketplace. Here, for the purposes of illustrations, a vertical experience can refer to shopping in a vertical market category, such as Groceries, Books, or Local Commerce. In some configurations, a search across an entire product catalog also can be considered a vertical experience.

As part of the first retrieval stage the computing system also can filter the first product identifiers using a first defined filtering model, such as a relevance filtering model. As a result, one or several product identifiers that are irrelevant to searchable query can be removed from further consideration.

A second retrieval stage can be implemented in order to pare the first product identifiers. To that end, the computing system can determine second product identifiers by removing duplicates from the filtered first product identifiers. Also as part of the second retrieval stage, the computing system can generate product attribute data using the second product identifiers. A portion of the product attribute data can define a group of features for a defined product identifier of the second product identifiers. As an example, for a product identifier that corresponds to a shoe, the product attribute data can define color, material, price range, markings (e.g., stripes), frequency of purchase, how often shoes are bought, recency of past purchase, and the like.

The computing system also can determine third product identifiers by filtering the second product identifiers using one or several filtering models. By configuring the number and type of the filtering models that are applied to the second product identifiers, the degree of selectivity in a group of candidate product identifiers can be adjusted. The type of filtering models can be, for example, specific to the defined intent conveyed by the verbal query, for example. Thus, filtering models that are not relevant to the intent need not be applied to the second product identifiers. Such flexibility is generally absent in commonplace technologies that implement a search for a product or an offer using a verbal query.

In addition, the computing system can determine a solution to an optimization problem with respect to a blending function based on the query data and the product attribute data. Such a solution results in a ranking of the third product identifiers. In some cases, the blending function can represent an optimization metric that is specific to the defined intent of the verbal query. The blending function permits creation of a ranking that is not constrained to a particular type of data source. For instance, the blending function can be evaluated using query data and product attribute data generated using multiple data sources, including first sources corresponding to respective vertical experiences, and second sources corresponding to the historical activity in a digital marketplace.

The blending function can be configured by defining the types of query data and/or the types of product attribute data that constitute feature inputs to the blending function. Because of such configurability, the ranking that can be created using the blending function is not constrained to a particular ranking model. Such a flexibility is, again, generally absent in commonplace technologies that implement a search for a product or an offer using a verbal query.

The ranking can be utilized to select one or many products for presentation at the intelligent assistant device 110 in response to the verbal query. The selected product(s) corresponds to respective product identifiers having respective particular placements in the ranking (top place, next to top place, etc.). For example, the computing system can select a product corresponding to a highest-ranked product identifier from the ranked third product identifiers. Thus, the ranking can represent a sequence of presentation positions of corresponding products. Regardless of how the ranking is utilized, a selected product represents a recommendation result for the verbal query.

The disclosed technologies are not limited to verbal queries, and can be used to generate recommendation results in response to textual queries. A textual query can be originated from a list of defined items (such as a shopping list) or within an electronic message in a chat or another type of messaging interface.

With reference to the drawings, FIG. 1 illustrates an example of an operational environment 100 for generation of recommendation results using verbal queries, in accordance with one or more embodiments of this disclosure. The exemplified operational environment 100 includes an intelligent assistant device 110 that can receive an utterance that includes a verbal query 104 that can have a defined intent. For purposes of illustration, the defined intent can refer to intended performance of a particular action. The intelligent assistant device 110 can convey the particular action to one or more service platform devices that can perform, at least in part, the particular action. A defined intent can be, for instance, a shopping intent, including actions such as "search," "buy," "check price," "deals," or similar. Thus, the verbal query 104 can include multiple terms (e.g., "buy shampoo" and "buy shampoo and conditioner") and, in some cases, can be complex. For instance, in connection with shopping intent, the verbal query 104 can be "buy shampoo for dry hair" or "recommend a book for toddler in Spanish."

The intelligent assistant device 110 is functionally coupled to a network architecture 108 that includes analysis units 112. The intelligent assistant device 110 can generate data representative of the verbal query 104. The audio data includes a digital representation of audio signal generated by a microphone of the intelligent assistant device 110. The intelligent digital assistant 110 can send the audio data to the analysis unit 112 by means of the network architecture 108. One or more units of the analysis units 112 can process the audio data to generate a textual query representing the verbal query 104. To that end, those unit(s) can apply automated speech recognition (ASR) operations to the audio data, resulting in query data 114 defining such a textual query.

The analysis units 112 also can generate other data associated with the verbal query 104, such as data defining an intent of the verbal query 104 and routing data for the textual query verbal query. Using the routing data, for example, one of the analysis units 112 can send the query data 114 to a device within search platform devices 120. The query data 114 can be sent by means of a network architecture 108.

The search service platform devices 120 can include a search orchestrator unit 130 that can receive the query data 114. The search orchestrator unit 130 can coordinate the generation of response data 134 using the query data 114. The response data 134 can define a particular recommendation result that is ultimately responsive to the verbal query 104 and, thus, represents a product offer. The device that receives the query data 114 also can send the response data 134 to the intelligent assistant device 110 via the network architecture 108. In response to receiving the response data 134, the intelligent assistant device 110 can present the recommendation result as an audible signal 138 identifying the recommendation result. The audible signal 138 can be generated by a speaker device of the intelligent assistant device 110, and can constitute a machine-generated utterance that conveys the recommendation result.

The search orchestrator unit 130 can coordinate the execution of multiple search stages in order to generate the response data 134. Each of those stage represents an extensibility element that can permit defining a custom configuration of the operations that generate the response data 134. The search orchestrator unit 130 can be functionally coupled to a query generator subsystem 140 that performs a query generation stage 144 based on the verbal query represented by the query data 114. The query generator subsystem 140 can include multiple computing devices that can perform, individually or collectively, operations that constitute the query generation stage 144.

Figure 2:
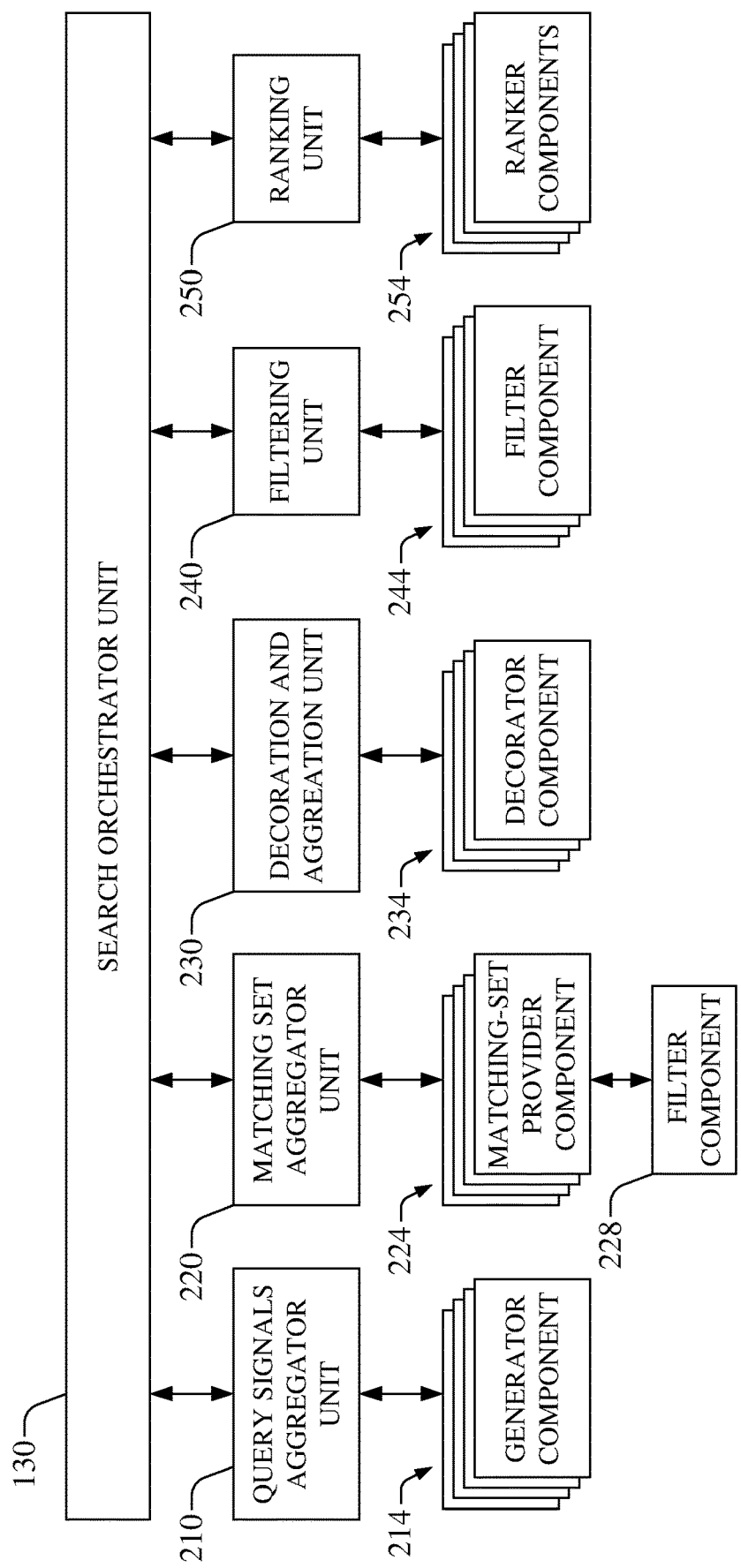
FIG. 2 illustrates an example of a system for generation of recommendation results using verbal queries, in accordance with one or more embodiments of this disclosure.

The query generator subsystem 140 can perform operations of the query generation stage 144 to generate a searchable query corresponding to the verbal query 104. To that end, the operations can include processing a textual query that results from automated speech recognition (ASR) operations. The textual query represents a textual version of the verbal query 104. Processing the textual query can include reformulating the textual query into the searchable query. The textual query can be reformulated by modifying the textual query to ensure syntactical correctness; augmenting the textual query or the revised textual query; paring the textual query; translating the textual query or the revised textual query; a combination of those operations; or similar other operations. Modifying the textual query can be accomplished, for example, by applying syntactical rules specific to the natural language in which the textual query is composed. In addition, as an example, augmenting and paring the textual query can be accomplished by applying other grammatical rules specific to such language. Further, or in some instances, a machine-learning model trained to predict intent of a fragment of text can be applied to augment or pare the textual query in order to adjust the textual query according to a predicted intent of that query. The textual query can be translated by applying a machine-learning model trained to generate a translation from a source language to a target language. In some embodiments, as is illustrated in FIG. 2, the query generator subsystem 140 can include multiple query generator components 214. A first component of the query generator components 214 can generate the textual query and also can reformulate the textual query into the searchable query.

The query generator subsystem 140 also can perform the query generation stage 144 to generate query data using the searchable query. The query data can include, for example, first data defining a query browse node, second data defining a sponsored query, third data defining a product brand, a combination of the foregoing data, or similar data. In addition, or in some embodiments, the query generator subsystem 140 can perform the query generation stage 144 to augment the query data with context data identifying context of an end-user associated with a user account corresponding to the intelligent assistant device 110. The end-user can utter the verbal query 104, for example. Accordingly, the context data can include, for example, one or a combination of first data identifying a shopping preference, second data identifying a location, and third data identifying a speaker identity corresponding to the verbal query.

The query generator subsystem 140 can access some portions of the context data from a data repository (not depicted in FIG. 1) that retains user profiles and/or other types of user account records identifying configuration(s) of the intelligent assistant device 110. Such a data repository can retain, for example, the second data identifying the location of the intelligent assistant device 110 and the third data identifying such a speaker identity. The query generator subsystem 140 can access other portions of the context data from another data repository (also not depicted in FIG. 1) that retains aggregated user activity data corresponding to the intelligent assistant device 110. The aggregated user activity data can include, for example, the first data identifying the shopping preference. The aggregated user activity data also can include other personalized data identifying, for example, brand preference, price preference, a dietary restriction, or a combination of the foregoing. In some embodiments, a second component of the query generator components 214 (FIG. 2) can generate the query data. One or more other components of the query generation components 214 can generate the context data. In addition, the query generator subsystem 140 also can include a query signals aggregator unit 210 that can collect the query data and the context data. The query signals aggregator unit 210 can supply the query data, the context data, and data defining the searchable query.

With further reference to FIG. 1, the search orchestrator unit 130 can utilize the searchable query to coordinate the determination of product identifiers that match the searchable query. In this disclosure, for purposes of illustration, a product identifier can be embodied in an alphanumeric code or another type of datum that uniquely identifies a product within a digital marketplace. Such a determination can be based on two retrieval stages: a matching stage and a decoration stage. Thus, the search orchestrator unit 130 can be coupled to a first retrieval subsystem I 150(1) that performs a retrieval stage I 154 to identify a group of product identifiers that match the searchable query. The retrieval stage I 154 corresponds to the matching stage. In addition, the search orchestrator unit 130 can be coupled to a second retrieval subsystem II 150(2) that performs a retrieval stage II 158 to generate item data defining attributes for a product identifier determined in the retrieval stage I 154. Additional product identifiers also can be generated in response to performing the retrieval stage II 158. The retrieval stage II 158 corresponds to the decoration stage.

The first retrieval subsystem I 150(1) can perform the retrieval stage I 154 to identify, using multiple data source devices, first product identifiers that match the searchable query. To that end, in some embodiments, the first retrieval subsystem I 150(1) can include multiple matching-set provider components 224 (FIG. 2). Each one of those components can utilize a subset of the multiple data source devices to determine a subset of the first product identifiers. In some instances, such subset of the multiple data source devices can constitute a data repository that includes data defining product identifiers pertaining to a particular vertical experience. As mentioned, for the purposes of illustrations, a vertical experience can refer to shopping in a vertical market category, such as Groceries, Books, or Local Commerce. In addition, in some configurations, a search across an entire product catalog also can be considered a vertical experience. In those embodiments, the first retrieval subsystem I 150(1) also can include a matching set aggregator unit 220 (FIG. 2) that can consolidate the determined subsets of product identifiers into the first product identifiers.

Each one of the multiple data source devices can pertain to a discrete data source that is either internal or external to a digital marketplace. The digital marketplace can administer product identifiers for a particular catalog of products. In some embodiments, respective subsets of the multiple data source devices constitute a first data repository 180(1), a second data repository 180(2), and a third data repository 180(3). As an illustration, the first data repository 180(1) can contain data generated within the digital marketplace, such as data defining an order history of products within the digital marketplace. The order history can be specific to a user account corresponding to the intelligent assistant device 110. The order history includes product identifiers of products purchased within the user account. In some embodiments, the order history can consolidate purchase activity data for several user accounts to extend the scope of product identifier numbers that may be identified in the query generation stage 144. Continuing with the illustration, the second data repository 180(2) also can be internal to the digital marketplace, and can include data defining deals or other types of offers for products within the digital marketplace. Further to the illustration, the third data repository 180(3) can be external to the digital marketplace, and can include data defining search results from a general search using the searchable query generated in the query generation stage 144. The disclosed technologies are not limited in that respect, and more than three data repositories or less than three repositories can be contemplated.

The first product identifiers resulting from the matching stage are schematically depicted in diagram 192a, FIG. 1. Each segment type—solid, dashed, and dash-dotted—represents a product identifier originating from a respective data repository (data repository 180(1), data repository 180(2), or data repository 180(3)). Further, a same product identifier can be a duplicate, originating from two or more of data repositories. For instance, a product identifier can be included in the data repository 180(1) (an order history repository, for example) and the data repository 180(2) (a deals repository, for example). Duplicate product identifiers are represented with thicker segments in the diagram 192a. Thickest segments (marked with an * in FIG. 1) represent product identifiers originating from data repository 180(1), data repository 180(2), and data repository 180(3).

The first retrieval subsystem I 150(1) can perform (or can continue performing) the retrieval stage I 154 to determine second product identifiers. Performing the retrieval stage I 154 can include filtering the first product identifiers using a first defined filtering model, resulting in the second product identifiers. In some instances, the first defined filtering model can define one or many relevance criteria to exclude a defined product identifier that is irrelevant to the searchable query. For example, the relevance criteria can include a rule based on a similarity metric that defines a similarity between a product identifier and the searchable query. The similarity can be textual or semantic. Here, textual similarity can refer to an amount of overlap between the searchable query and a name of a product corresponding to the product identifier. In addition, semantic similarity can refer to the amount of overlap in the meaning of the product name and the searchable query. More specifically, the rule can dictate that a product identifier must be excluded from a group of product identifiers when the similarity metric is less than a threshold value. Accordingly, the second product identifiers exclude a group of product identifiers present in the first product identifiers. Each one of the product identifiers in that group fails to satisfy a relevance criterion. The second product identifiers are schematically depicted in diagram 192b. In some embodiments, a filter component 228 (FIG. 2) can apply the first defined filtering model (e.g., a relevance filtering model) to the first product identifiers.

The search orchestrator unit 130 can cause the second retrieval subsystem II 150(2) to perform the retrieval stage II 158 to determine third product identifiers by removing duplicates from the second product identifiers. Such a removal does not exclude a product identifier that is replicated in the second product identifiers, but instead results in a single instance of the product identifier. The third product identifiers are schematically depicted in diagram 194a. The segments in diagram 194a have a common thickness because there are no duplicates.

The second retrieval subsystem II 150(2) can perform (or can continue performing) the retrieval stage II 158 to generate product attribute data for at least one of the third product identifiers. In some cases, the product attribute data define a set of features for each one of the third product identifiers. The augmentation that results from generating sets of features for respective third product identifiers is represented with a "+" adjacent to each segment in the diagram 194b. In other cases, the product attribute data can define an additional product identifier that substitutes a product identifier that has been identified in the retrieval stage I 154. In addition, or in yet other cases, the product attribute data that can be generated can define an additional product identifier that supplements a product identifier that has been identified in the retrieval stage I 154.

The search orchestrator unit 130 can then remove other identifiers from the third product identifiers resulting from the implementation of the retrieval stage II 158. To that end, the search orchestrator unit 130 can cause a filtering subsystem 160 to perform a filtering stage 164. By performing the filtering stage 164, the filtering subsystem 160 can determine fourth product identifiers according to at least one filtering model. In one configuration, the at least one filtering model can include multiple filtering models. Thus, by performing the filtering state 164, the filtering subsystem 160 can apply the multiple filtering models to remove product identifiers using various removal rules. In one example, each filtering model of the multiple filtering models can define a removal rule that is applied to a product identifier in response to applying a filtering model. In some configurations, removal rules can be defined based on business scenarios that may be applicable to the defined intent of the verbal query 104. In some embodiments, the filtering subsystem 160 can include multiple filter components 244 (FIG. 2) that can apply respective ones of the multiple filtering models. The filtering subsystem 170 also can include a filtering unit 240 (FIG. 2) that can direct the one or several of the multiple filter components 244 to apply respective filter model(s).

Removal rules utilized to remove product identifiers can include, for example, a combination of an eligibility rule, a pricing rule, an availability rule, an exclusion rule. In one example, the eligibility rule dictates that a product identifier must be removed from a set of product identifiers unless a user account associated with a verbal query is eligible for the product identified by the product identifier. In another example, the pricing rule dictates that a product identifier must be removed from the set of product identifiers unless price sharpness of a price of the product identified by the product identifier exceeds a defined threshold. In yet another example, the availability rule dictates that a product identifier must be removed from the set of product identifiers unless the product identified by the product identifier is in stock. In still another example, the exclusion rule dictates that a product identifier must be removed from the set of product identifiers unless the product corresponding to the product identifier is present in an exclusion list. Simply as an illustration, the exclusion list can identify products that are inappropriate or otherwise unacceptable for inclusion in recommendation results.

Simply as an illustration, diagram 196 presents an example of fourth product identifiers resulting from the implementation of the filtering stage 164. Those fourth product identifiers can originate from the data repository 180(1), data repository 180(2), and data repository 180(3). In some embodiments, instead of removing a product identifier as a result of applying a removal rule to the product identifier, the product identifier can be marked as "filtered." The product identifier can be marked as filtered by configuring an associated filtering status indicator to a value indicating that the product identifier has been filtered out. For instance, the filtering status indicator can be a logical variable, e.g., filter-state, for the sake of nomenclature, that can be set to .true. to indicate that an associated product identifier has been filtered out.

The search orchestrator unit 130 can cause a ranking subsystem 170 to perform a ranking stage 174. By performing the ranking stage 174, the ranking subsystem 170 can generate a ranking of the fourth product identifiers using a blending function. The blending function can be based on the product attribute data generated in the retrieval stage II 158 for the product identifiers determined in the retrieval stage I 154. The blending function also can be based on the query data generated in the query generation stage 144. By depending on both product attribute data and query data, the blending function is unconstrained to a particular prioritization of product identifiers originating from candidate providers in a defined sequence. Further, because the particular form of the blending function can be customized to the defined intent of a query, the blending function can yield a greater degree of personalization of the ranking of product identifiers compared to other ranking utilized in commonplace search technologies.

As mentioned, the product attribute data define a rich set of features for those product identifiers. Features in such a set can include behavioral data, such as impression and conversions for particular product identifiers, brands, and similar. Other features in such set can include personalized data defining brand preference or price preference, or both. Brand preference and price preference can be determined at the brand level (e.g., a preferred brand); at a product category level (e.g., preferred brand for blue jeans, for example); at a query level (e.g., preferred brand for a "buy item" query); or similar. Still other features include data provider signals. Those signals define product attribute data including, conversion rates for product identifiers within a particular data repository (e.g., data repository 180(1)). The signals also can include product attribute data defining probabilities that product identifiers within the particular data repository match a searchable query. The signals can further define parameters specific to a vertical experience. For example, the parameters can include ingredient properties, purchase frequency, purchase recency, probability of a brand being a preferred brand, or the like. Query data define other features for those product identifiers. For instance, a similarity (textual or semantic, or both) between a searchable query and a product identifier can determine similarity features that also can be input into the blending function.

The ranking subsystem 170 can determine a solution to an optimization problem with respect to the blending function over a space of features determined for the product identifiers being ranked. The optimization problem can be a maximization problem in which a specific ranking of the product identifiers is sought to maximize the blending function. In some configurations, the specific ranking can be sought to maximize multiple blending functions concurrently. By determining such a solution, a relationship between features and a ranking metric can be learned. Different machine-learning techniques (deep learning, linear regression, etc.) can be used to determine such a solution and, thus, learn a ranking model represented by the blending function. Product attribute data defining a first group of features for a defined product identifier can determine a ranking score of the defined product identifier. The ranking score is determined by the blending function that is optimized. The ranking score represents a probability that the defined product identifier is related to the verbal query 104. The solution represents a global optimum in the subspace of product identifiers identified for the verbal query 104.

In some instances, the blending function can be specific to the defined intent of the verbal query 104. In particular, the blending function defines a metric specific to the defined intent (e.g., "buy an item" or "check price of an item"). By solving a maximization problem with respect to that metric, the ranking of the product identifiers can be optimal for the defined intent. In other words, the ordering of the product identifiers results yields a metric that is maximal over the space of features defined by query data and product attribute data determined using those product identifiers.

In some embodiments, as is illustrated in FIG. 2, the ranking subsystem 170 can include multiple ranker components 254. Each one of the ranker components 254 can define a blending function specific to a defined intent. The ranking subsystem 170 also can include a ranking unit 250 that can configure the optimization problem with respect to the blending function using the query data and the product attribute data.

With further reference to FIG. 1, in some instances, a selection component (not depicted in FIG. 1) can select the top-ranked product identifier as a response to the verbal query 104. Data identifying a product corresponding to the top-ranked product identifier (marked with "1st" in FIG. 1) can be included in the response data 134 and can be sent to the intelligent assistant device 110. The response data 134 embodies, for example, a product offer for the verbal query 104. It is noted that the disclosed technologies are not limited to selecting the top-ranked product identifier to form a recommendation result (or product offer). In some instances, such a selection component can select a product identifier having a particular placement within a ranking of product identifiers. In other instances, such a selection component can select multiple product identifiers having respective particular placements with the ranking—e.g., the top-three ranked product identifiers can be selected.

Figure 3:
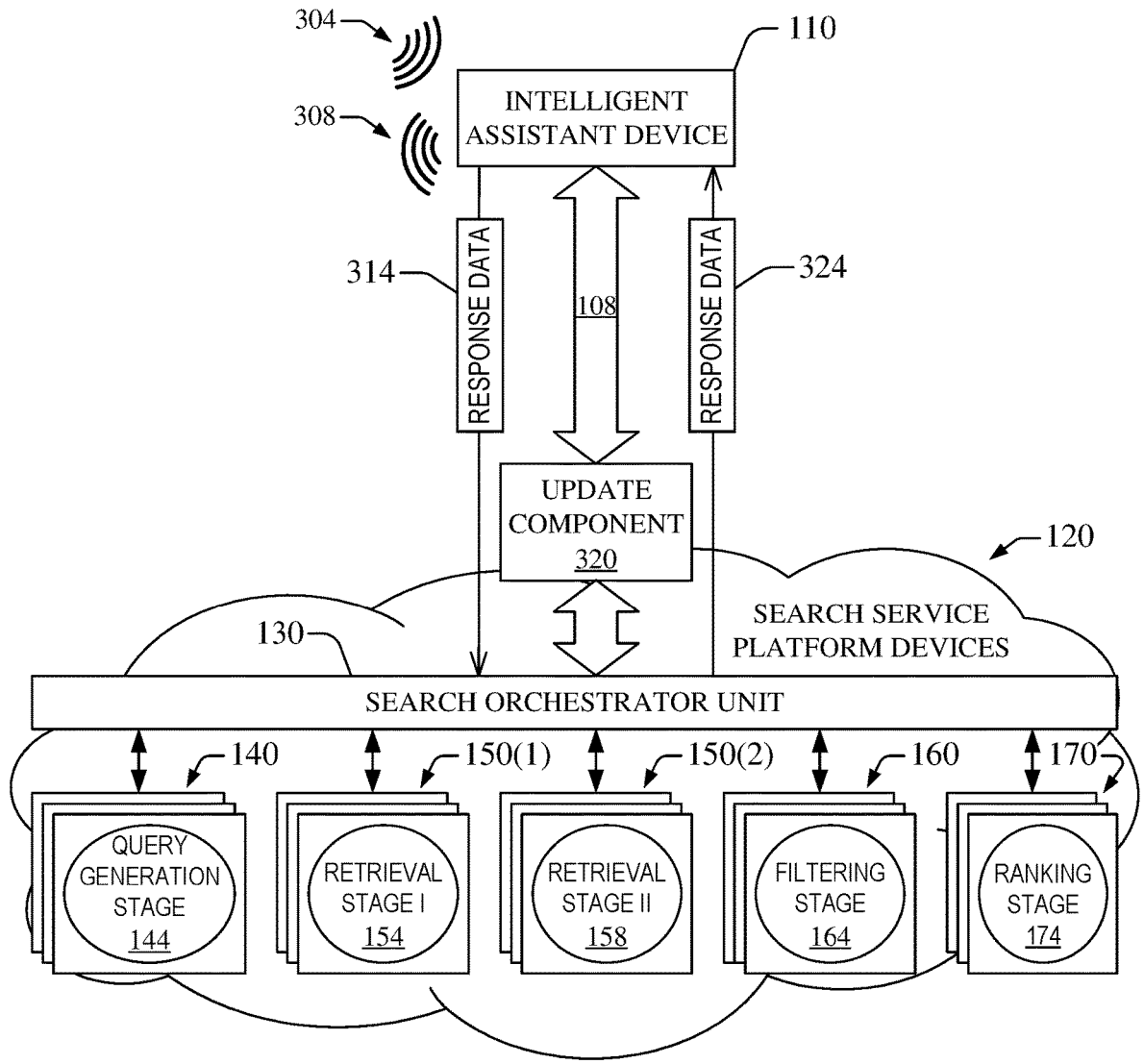
FIG. 3 illustrates an example of an operational environment for the update of a product offer resulting from search results using a verbal query, in accordance with one or more embodiments of this disclosure.

In some cases, a product offer may be unsatisfactory to the end-user that uttered the verbal query 104. FIG. 3 illustrates an example of an operational environment in which the product offer can be updated, in accordance with one or more embodiments of this disclosure. The intelligent assistant device 110 can deliver an audible signal that identifies a product corresponding to product identifier having a particular rank (or placement) within a ranking of product identifiers for the verbal query 104. For instance, the audible signal can be the audible signal 138 (FIG. 1). In response to the audible signal, a microphone of the intelligent assistant device 110 can receive an external audible signal 304 representing an assessment of the product offer. Thus, the external audible signal 304 can represent either acceptance of the product offer or rejection of the product offer. Acceptance of the product offer indicates that the product corresponding to the product offer is satisfactory. Rejection of the product offer indicates that such a product is unsatisfactory.

The intelligent assistant device 110 can generate response data 314 identifying the assessment of the product offer. The response data 314 can be generated using the external audible signal 304. The intelligent assistant device 110 can send the response data to an update component 320 that can analyze the response data 314. In some instances, the update component 320 can determine that the response data 314 includes a keyword or keyphrase representing rejection of the product offer (or related product). The keyword can be "Next" or "Nope," for example. The keyphrase can be "Not Good" or "No Bueno," for example. Such a keyword and the keyphrase can be configured by an end-user of the intelligent assistant device 110. As is illustrated in FIG. 3, the update component 320 can be included in the search service platform devices 120. In other embodiments, the update component 320 can be functionally coupled to one of the search service platform devices 120.

In response, the update component 320 can direct the selection component (not depicted in FIG. 3) to select a product identifier having a second rank (or placement) in the ranking of product identifiers for the verbal query 104. The second rank can be lower than the particular rank of a product offer previously presented by the intelligent assistant device 110. For instance, the second rank can be the second-highest rank (denoted with "2nd" in diagram 198 (FIG. 1)). As a result, the search orchestrator unit 130 can send response data 324 identifying the product corresponding to the product identifier having the second rank.

It is noted that other mechanisms can be implemented to update an unsatisfactory product offer. For example, the blending function utilized to generate a ranking of product identifiers can be updated.

It is also noted that other mechanisms can be implemented to accept or reject a product offer. Some of those mechanisms include the assessment of a product offer without supplying an aural response (e.g., audible signal 304) upon presentation of the product offer at the intelligent assistant device 110. Such mechanisms can be referred to as asynchronous mechanisms because of the absence of an immediate response (e.g., within several seconds) to the presentation of the product offer. In one asynchronous mechanism, the product offer can be directly added to a data structure defining a shopping cart of a user account corresponding to the intelligent assistant device 110. The product offer can be made available for review at a later time after presentation of the product offer. For example, the product offer can be reviewed within minutes, hours, or days after the presentation of the product offer. In one configuration, the offer can be accepted or rejected by means of selection of a selectable user-interface (UI) element. A rejected offer can be updated in accordance with aspects described herein. An updated product offer can be added to the data structure defining the shopping cart, thus updating the shopping cart and selectable UI elements to accept or reject the updated product offer. In other configurations, products corresponding to multiple product identifiers in a ranking can be added to the data structure defining the shopping cart. For example, five products corresponding to respective five top-ranked product identifiers can be added to such data structure. See, as an illustration, diagram, 198 in FIG. 1. One or several of those products can be accepted using selectable UI elements, for example.

Figure 4:
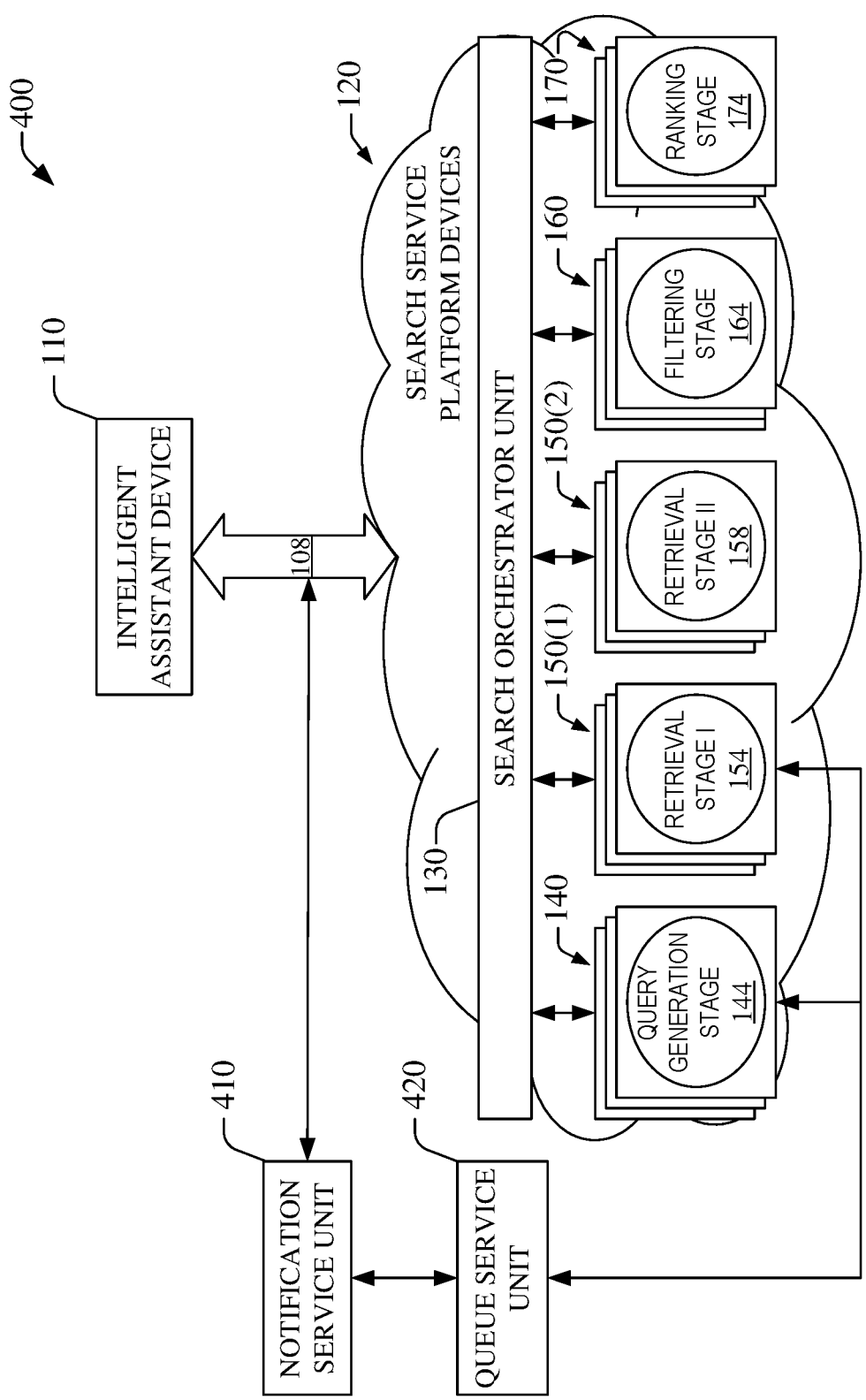
FIG. 4 illustrates an example of an operational environment for reduction of latency that may be associated with the generation of recommendation results using verbal queries, in accordance with one or more embodiments of this disclosure.

By implementing a multi-stage search approach to the generation of recommendation results using a verbal query, some embodiments of the disclosed technologies might not ensure a fixed latency when processing the verbal query. FIG. 4 illustrates an example of an operational environment 400 for reduction of latency that may associated with the generation of recommendation results using verbal queries, in accordance with one or more embodiments of this disclosure. Search components, such as signal providers (e.g., components 214 (FIG. 2)) and matching-set provider components (e.g., components 224 (FIG. 2)) can speculatively begin processing an upcoming possible search request (e.g., verbal query 104) by subscribing to a specific notification service topic. The notification service can be provided by a notification service unit 410. The notification service can be embodied in a Simple Notification Service, for example. The notification service topic can be used by one or more upstream components to notify those components of an upcoming possible search request with context, such as a customer identification (ID) and a query. A queue service unit 420 can cause a proactive implementation of the query search stage 144 and the retrieval stage I 154. To that end, the queue service unit 420 can send a directive to the query generation subsystem 140 to implement such stages. In one configuration, the directive can be embodied in a function an application programming interface (API) or an instruction of another type of program code. Such an instruction or a function call to the function can provide the customer ID and the query as payload data. The queue service unit 420, in some instances, can send the directive to the search orchestrator unit 130 that, in response, can proactively implement such stages. The operational environment 400, in some cases in conjunction with the implementation of latency budgets, can constrain the latency associated with the multi-stage approach to less than about 200 milliseconds.

Figure 5:
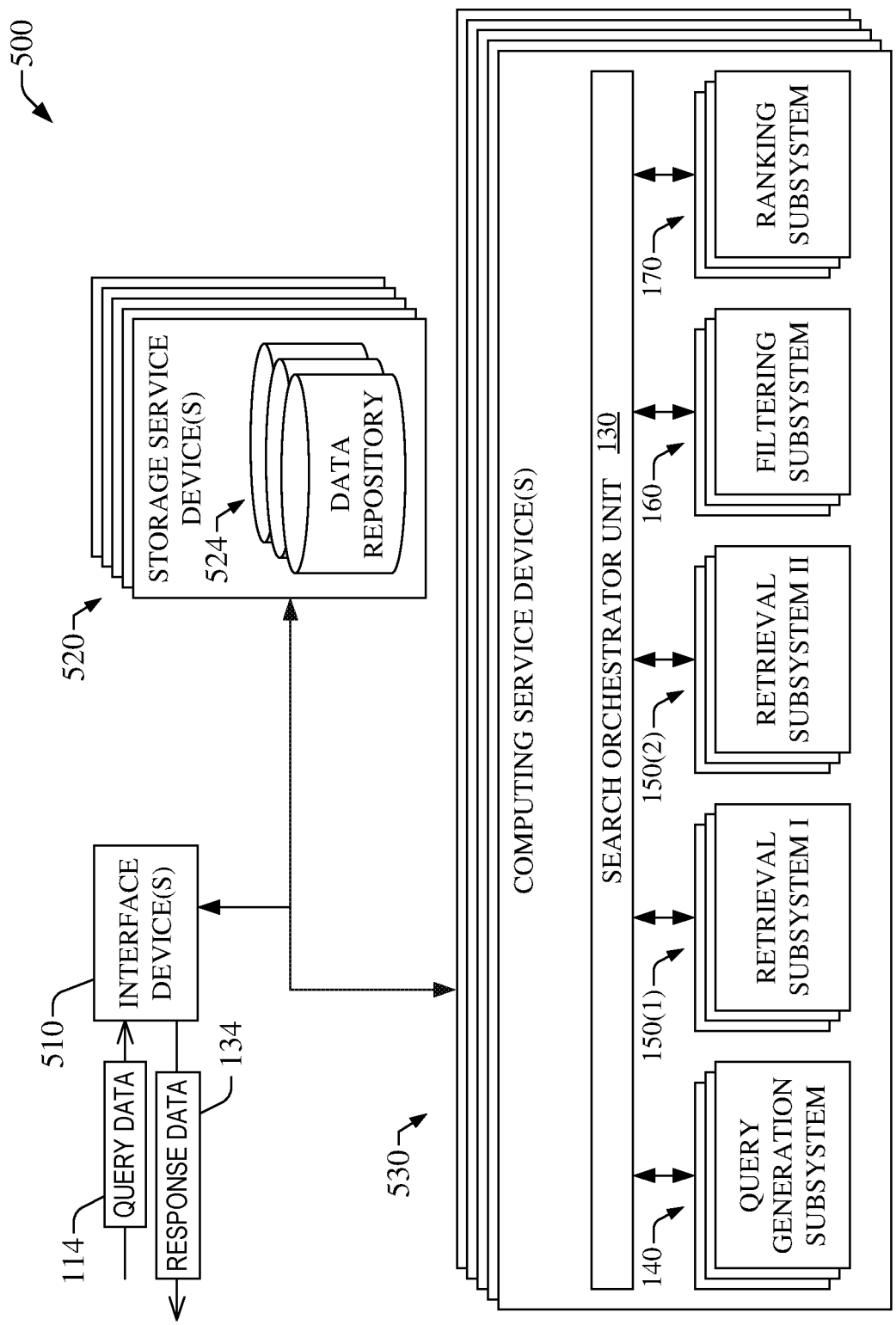
FIG. 5 illustrates an example of a computing system for generation of recommendation results using verbal queries, in accordance with one or more embodiments of this disclosure.

FIG. 5 is a schematic block diagram of an example of a computing system 500 for generation of recommendation results using verbal queries, in accordance with one or more embodiments of this disclosure. The computing system 500 includes one or many interface devices 510. In some embodiments, at least one first device of the interface device(s) 510 can receive query data 114 and can send response data 134, in accordance with aspects described herein. Such first device(s) can include in a computer-executable module retained in one or many memory devices. The first device(s) also can include one or many processors functionally coupled to memory device(s). At least one of the processor(s) can execute the computer-executable module to receive the query data 114 and to send the response data 134. In one configuration, the computer-executable module can include an application programming interface (API) and/or another type of program code that can permit receiving the query data 114 in response to a function call, for example. In addition, or in another configuration, the computer-executable module can include another API or yet another type of program code that can permit sending the response data 134 in response to a function call, for example.

The computing system 500 can include one or many computing service devices 530 that can generate recommendation results using the query data 114. As such, at least one of the computing service device(s) 530 receive the query data 114 from at least one of the interface device(s) 510. In addition, the computing service device(s) 530 can include the search orchestrator unit 130. The search orchestrator unit 130 can operate in accordance with functionality described herein, receiving the query data 114 and coordinating the generation of the response data 134 using the query data 114.

To that end, the computing service device(s) 530 also can include the query generation subsystem 140, the retrieval subsystem I 150(1), the retrieval subsystem II 150(2), the filtering subsystem 160, and the ranking subsystem 170. Each one of those subsystems can be functionally coupled to the search orchestrator unit 130. In addition, at least one of those subsystems can be functionally coupled to storage service device(s) 520, to access various data to generate recommendation results in accordance with aspects disclosed herein. Such a coupling can be direct or can be mediated by one or many of the interface device(s) 510.

Subsets of the storage service device(s) 520 can embody respective data repositories 524. One or many devices of the storage service device(s) 520 can retain filtering models, such as a relevance filtering model and one or more other types of filtering models in accordance with aspects described above. In addition, one or many second devices of the storage service device(s) 520 can retain one or a combination of query data, context data, or product attribute data in accordance with aspects described herein. Further, one or many third devices of the storage service device(s) 420 can retain at least one blending function utilized to generate a ranking of product identifiers in response to the query data 114.

Figure 6:
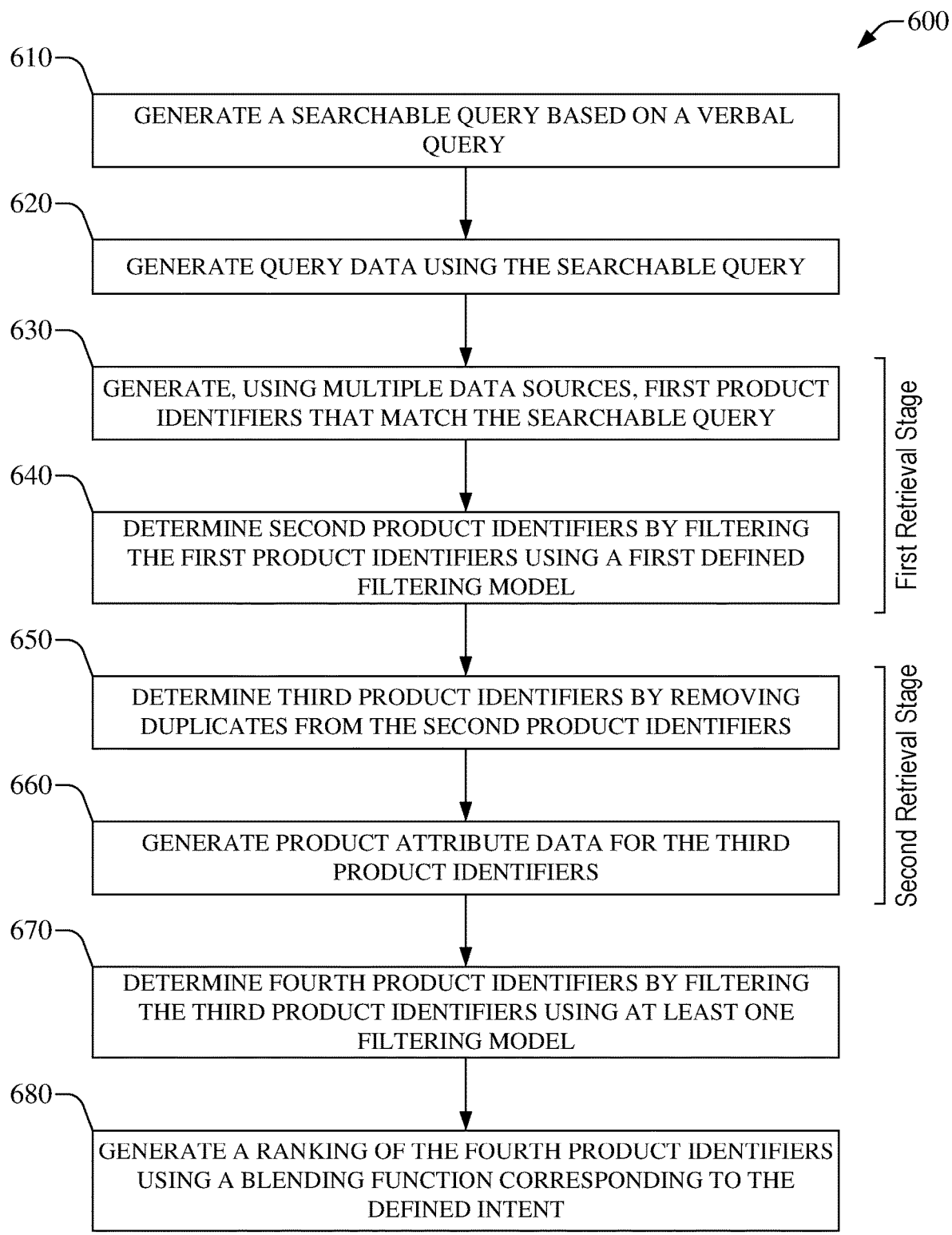
FIG. 6 illustrates an example of a method for generating recommendation results using a verbal query, in accordance with one or more embodiments of this disclosure.

In view of the functionality of the technologies disclosed herein, example methods that can be implemented in accordance with this disclosure can be more readily appreciated with reference to the flowchart in FIG. 6. For purposes of simplicity of explanation, the example methods disclosed herein are presented and described as a series of blocks (with each block representing an action or an operation in a method, for example). However, it is to be understood that the disclosed methods are not limited by the order of blocks and associated actions or operations, as some blocks may occur in different orders and/or concurrently with other blocks from that are shown and described herein. For example, the various techniques of this disclosure can be alternatively represented as a series of interrelated states or events, such as in a state diagram. Further, not all illustrated blocks, and associated operations(s), may be required to implement a method in accordance with aspects of this disclosure. Further yet, two or more of the disclosed methods can be implemented in combination with each other, to accomplish one or more functionalities and/or advantages of the technologies disclosed herein.

It is noted that the methods of this disclosure can be retained on an article of manufacture, or computer-readable non-transitory storage medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. One or more processors, such as processor(s) that implement (e.g., execute) one or more of the disclosed methods, can be employed to execute code instructions retained in a memory device, or any computer-readable or machine-readable medium, to implement the one or more methods. The code instructions can provide a computer-executable or machine-executable framework to implement the methods described herein.

FIG. 6 illustrates an example of a method 600 for generating recommendation results using a verbal query, in accordance with one or more embodiments of this disclosure. The example method 600 can be implemented, entirely or partially, by a computing system having various computing resources. The computing system has at least one processor and/or is functionally coupled to at least one processor that can implement (e.g., compile, execute, compile and execute, etc.) one or more blocks of the example method 600. The computing system also can include one or many memory devices, other types of computing resources, or a combination thereof. Such processor(s), memory device (s), and computing resource(s), individually or in a particular combination, can permit the computing system to implement the example method 600, entirely or partially. The computing resources can include operating system(s); software for configuration and/or control of a virtualized environment; firmware; CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 600 can be implemented in a distributed fashion by two or more computing devices contained in the computing system. Each one of the two or more computing devices can have at least one processor or can be functionally coupled to at least one processor, where such processor(s) can implement at least one of the one or more blocks. The computing device(s) also can include memory device(s) and/or other computing resources. Regardless of the example method 600 being implemented by a distributed or non-distributed computing system, the at least one processor can be functionally coupled to at least one memory device or other types of computer-readable non-transitory storage media.

At block 610, the computing system can generate a searchable query based on a verbal query. The searchable query can be generated from a textual query representative of the verbal query. As mentioned, the textual query can be generated by applying ASR to audio data representing the verbal query. The computing system can then reformulate the textual query, resulting in the searchable query. Reformulating the textual query can include, for example, revising the textual query for syntactical correctness, augmenting the textual query, translating the textual query from a source language to a target language, a combination thereof, or the like. As mentioned, the verbal query can have a defined intent. For instance, the defined intent can be performance of a particular action. An intelligent assistant device that receives the verbal query can convey the particular action to one or more service platform devices to carry out the particular action. The verbal query can be the verbal query 104 (FIG. 1), for example.

At block 620, the computing system can generate query data using the searchable query. The query data can include, for example, first data defining a query browse node, second data defining a sponsored query, third data defining a product brand, a combination of the foregoing, or similar data. The computing system also can augment the query data with context data identifying context of an end-user associated with a user account corresponding to the intelligent assistant device. The context data can include, for example, one or a combination of first data identifying a shopping preference of the end-user; second data identifying a location of the intelligent assistant device; and third data identifying a speaker identity corresponding to the verbal query.

At block 630, the computing system can generate, using multiple data sources, first product identifiers that match the searchable query. Each one of the multiple data sources can correspond to a data repository, for example. At block 640, the computing system can determine second product identifiers by filtering the first product identifiers using a first defined filtering model, such as a relevance filtering model. In some instances, the first defined filtering model can define one or many removal rules. Thus, the second product identifiers exclude a group of identifiers that are included in the first product identifiers and satisfy a removal rule. Block 630 and block 640 constitute a first retrieval stage (e.g., retrieval stage I in FIG. 1).

At block 650, the computing system can determine third product identifiers by removing duplicates from the second product identifiers. For an illustration, see diagram 192b and diagram 194a in FIG. 1. At block 660, the computing system can generate product attribute data for the third product identifiers. As mentioned, a portion of the product attribute data can define a group of features for a particular product identifier of the third product identifiers. Block 650 and block 660 constitute a second retrieval stage (e.g., retrieval stage II in FIG. 1).

At block 670, the computing system can determine fourth product identifiers by filtering the third product identifiers using at least one filtering model. In some embodiments, multiple filtering models can be applied in order to remove product identifiers that satisfy various removal rules. In some configurations, instead of excluding product identifiers that satisfy the removal rules, those product identifiers can be marked as "filtered." As is disclosed above, the removal rules can include, for example, a combination of an eligibility rule, a pricing rule, an availability rule, an exclusion rule. At block 680, the computing system can determine a ranking of the fourth product identifiers using one or several blending functions. As mentioned, the blending function can define an optimization metric corresponding to the defined intent.

Figure 7:
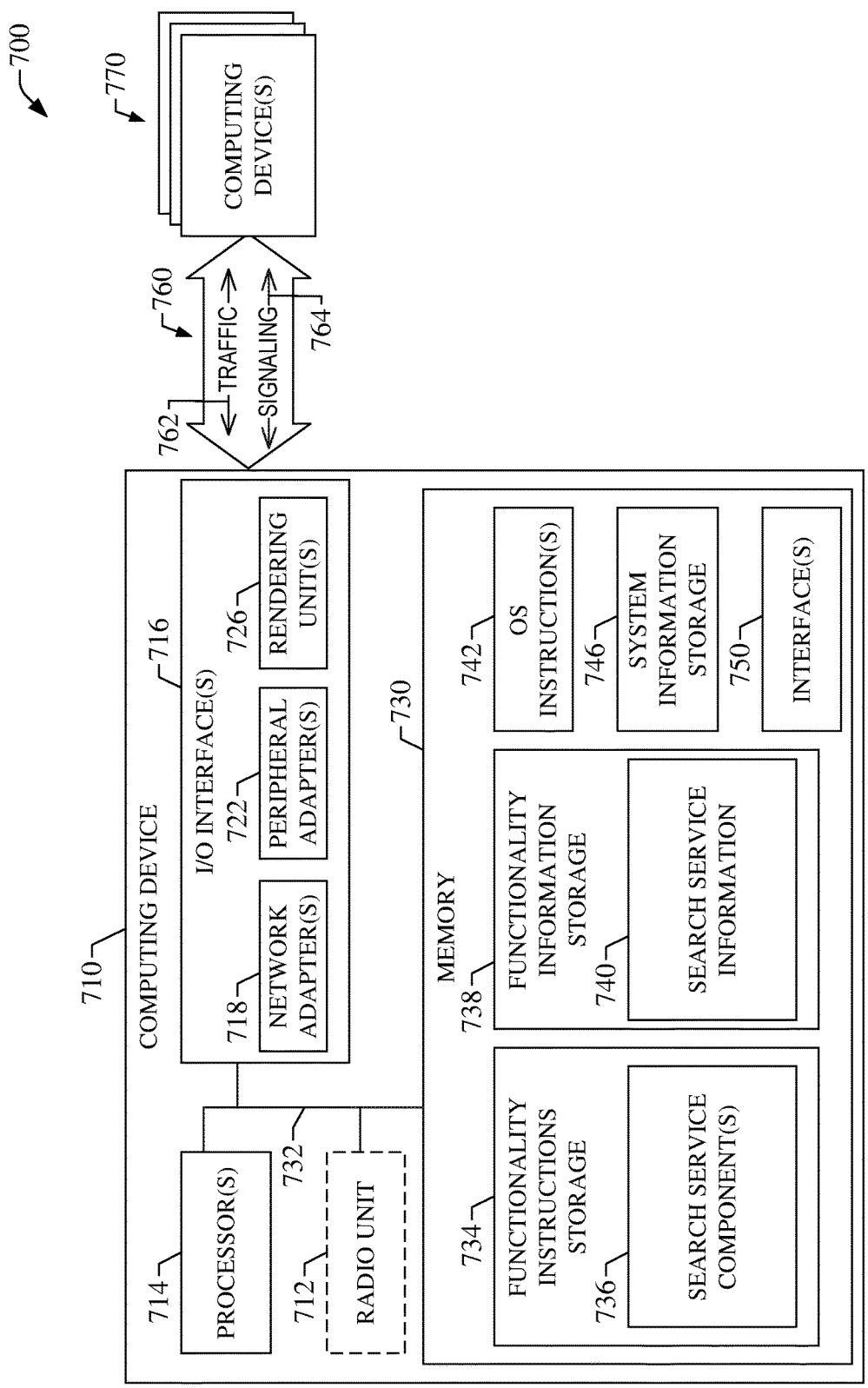
FIG. 7 illustrates an example of a computational environment for generation of recommendation results using verbal queries, in accordance with one or more embodiments of the disclosure.

FIG. 7 illustrates a block diagram of an example computational environment 700 for generation of recommendation results using verbal queries, in accordance with one or more aspects of the disclosure. The example computational environment 700 is merely illustrative and is not intended to suggest or otherwise convey any limitation as to the scope of use or functionality of the computational environment's architecture. In addition, the illustrative computational environment depicted in FIG. 7 should not be interpreted as having any dependency or requirement relating to any one or combination of components illustrated in the example operational environments of the disclosure. The example computational environment 700 or portions thereof can embody, or can include, for example, one or more of the operational environment 100 or the computing system 500.

The computational environment 700 represents an example implementation of the various aspects or features of the disclosure in which the processing or execution of operations described in connection with the generation of recommendation results using verbal queries as is disclosed herein can be performed in response to execution of one or more software components at the computing device 710. It should be appreciated that the one or more software components can render the computing device 710, or any other computing device that contains such components, a particular machine for generation of recommendation results using verbal queries as is described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods disclosed herein, such as the example method presented in FIG. 6.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 710 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the generation of recommendation results using verbal queries as is described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 710 can comprise one or more processors 714, one or more input/output (I/O) interfaces 716, a memory 730, and a bus architecture 732 (also termed bus 732) that functionally couples various functional elements of the computing device 710. In certain embodiments, the computing device 710 can include, optionally, a radio unit 712. The radio unit 712 can include one or more antennas and a communication processing unit that can permit wireless communication between the computing device 710 and another device, such as one of the computing device(s) 770. The bus 732 can include at least one of a system bus, a memory bus, an address bus, or a message bus, and can permit exchange of information (data, metadata, and/or signaling) between the processor(s) 714, the I/O interface(s) 716, and/or the memory 730, or respective functional elements therein. In certain scenarios, the bus 732 in conjunction with one or more internal programming interfaces 750 (also referred to as interface(s) 750) can permit such exchange of information. In scenarios in which processor(s) 714 include multiple processors, the computing device 710 can utilize parallel computing.

The I/O interface(s) 716 can permit communication of information between the computing device and an external device, such as another computing device, e.g., a network element or an end-user device. Such communication can include direct communication or indirect communication, such as exchange of information between the computing device 710 and the external device via a network or elements thereof. As illustrated, the I/O interface(s) 716 can comprise one or more of network adapter(s) 718, peripheral adapter(s) 722, and rendering unit(s) 726. Such adapter(s) can permit or facilitate connectivity between the external device and one or more of the processor(s) 714 or the memory 730. For example, the peripheral adapter(s) 722 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 718 can functionally couple the computing device 710 to one or more computing devices 770 via one or more traffic and signaling pipes 760 that can permit or facilitate exchange of traffic 762 and signaling 764 between the computing device 710 and the one or more computing devices 770. Such network coupling provided at least in part by the at least one of the network adapter(s) 718 can be implemented in a wired environment, a wireless environment, or both. The information that is communicated by the at least one of the network adapter(s) 718 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 770 can have substantially the same architecture as the computing device 710. In addition or in the alternative, the rendering unit(s) 726 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 710, or can permit conveying or revealing the operational conditions of the computing device 710.

In one aspect, the bus 732 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 732, and all buses described herein can be implemented over a wired or wireless network connection and each of the subsystems, including the processor(s) 714, the memory 730 and memory elements therein, and the I/O interface(s) 716 can be contained within one or more remote computing devices 770 at physically separate locations, connected through buses of this form, in effect implementing a fully distributed system. In certain embodiments, such a distributed system can implement the functionality described herein in a client-host or client-server configuration in which the search service component(s) 736 or the search service information 740, or both, can be distributed between the computing device 710 and at least one of the computing device(s) 770, and the computing device 710 and at least one of the computing device(s) 770 can execute such components and/or leverage such information.

The computing device 710 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 710, and can comprise, for example, both volatile and non-volatile media, and removable and/or non-removable media. In one aspect, the memory 730 can comprise computer-readable media in the form of volatile memory, such as random access memory (RAM), and/or non-volatile memory, such as read-only memory (ROM).

The memory 730 can comprise functionality instructions storage 734 and functionality information storage 738. The functionality instructions storage 734 can comprise computer-accessible instructions that, in response to execution (by at least one of the processor(s) 714), can implement one or more of the functionalities of the disclosure. The computer-accessible instructions can embody or can comprise one or more software components illustrated as search service component(s) 736. In one scenario, execution of at least one component of the search service component(s) 736 can implement one or more of the methods described herein, such as the example method 600. For instance, such execution can cause a processor (e.g., one of the processor(s) 714) that executes the at least one component to carry out one or a combination of the disclosed example methods. It should be appreciated that, in one aspect, a processor of the processor(s) 714 that executes at least one of the search service component(s) 736 can retrieve information from or retain information in one or more memory elements 740 in the functionality information storage 738 in order to operate in accordance with the functionality programmed or otherwise configured by the search service component(s) 736. The one or more memory elements 740 may be referred to as search service information 740. Such information can include at least one of code instructions, information structures, or the like. For instance, at least a portion of such information structures can be indicative of a mapping or categorization of communication session and virtual locations; access rules; and/or preferences for promotional content.

In some embodiments, one or more components of the search service component(s) 736 can embody, or can be part of, at least one of the query generation subsystem 140, the retrieval subsystem I 150(1), the retrieval subsystem II 150(2), the filtering subsystem 160, or the ranking subsystem 170. As such, the one or more components can operate in accordance with, and can provide the functionality of, the query generation subsystem 140, the retrieval subsystem I 150(1), the retrieval subsystem II 150(2), the filtering subsystem 160, or the ranking subsystem 170, or a combination thereof, in accordance with aspects described in this disclosure. In other embodiments, one or more of the search service component(s) 736 in combination with at least one of the processor(s) 714 can embody, or can be part of, at least one of the query generation subsystem 140, the retrieval subsystem I 150(1), the retrieval subsystem II 150(2), the filtering subsystem 160, or the ranking subsystem 170, and can operate in accordance with, and can provide the functionality of, such units in accordance with aspects described in this disclosure.

At least one of the one or more interfaces 750 (e.g., application programming interface(s)) can permit or facilitate communication of information between two or more components within the functionality instructions storage 734. The information that is communicated by the at least one interface can result from implementation of one or more operations in a method of the disclosure. In certain embodiments, one or more of the functionality instructions storage 734 and the functionality information storage 738 can be embodied in or can comprise removable/non-removable, and/or volatile/non-volatile computer storage media.

At least a portion of at least one of the search service component(s) 736 or search service information 740 can program or otherwise configure one or more of the processors 714 to operate at least in accordance with the functionality described herein. One or more of the processor(s) 714 can execute at least one of the search service component(s) 736 and leverage at least a portion of the information in the functionality information storage 738 in order to provide generation of recommendation results using verbal queries in accordance with one or more aspects described herein.

It should be appreciated that, in certain scenarios, the functionality instruction(s) storage 734 can embody or can comprise a computer-readable non-transitory storage medium having computer-accessible instructions that, in response to execution, cause at least one processor (e.g., one or more of the processor(s) 714) to perform a group of operations comprising the operations or blocks described in connection with the disclosed methods.

In addition, the memory 730 can comprise computer-accessible instructions and information (e.g., data, metadata, and/or programming code instructions) that permit or facilitate the operation and/or administration (e.g., upgrades, software installation, any other configuration, or the like) of the computing device 710. Accordingly, as illustrated, the memory 730 can comprise a memory element 742 (labeled operating system (OS) instruction(s) 742) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 710 can dictate a suitable OS. The memory 730 also comprises system information storage 746 having data, metadata, and/or programming code that permits or facilitates the operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the OS instruction(s) 742, are illustrated herein as discrete blocks, such software components can reside at various times in different memory components of the computing device 710, and can be executed by at least one of the processor(s) 714. In certain scenarios, an implementation of the search service component(s) 736 can be retained on or transmitted across some form of computer-readable media.

The computing device 710 and/or one of the computing device(s) 770 can include a power supply (not shown), which can power up components or functional elements within such devices. The power supply can be a rechargeable power supply, e.g., a rechargeable battery, and it can include one or more transformers to achieve a power level suitable for the operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or one of the computing device(s) 770.

The computing device 710 can operate in a networked environment by utilizing connections to one or more remote computing devices 770. As an illustration, a remote computing device can be a personal computer, a portable computer, a server, a router, a network computer, a peer device or other common network node, and so on. As described herein, connections (physical and/or logical) between the computing device 710 and a computing device of the one or more remote computing devices 770 can be made via one or more traffic and signaling pipes 760, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 770) that are functionally coupled (e.g., communicatively linked or otherwise coupled) through a network having traffic and signaling pipes and related network elements. In a distributed computing environment, in one aspect, one or more software components (such as program modules) can be located in both a local computing device 710 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise solid state drives, hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for generation of recommendation results using verbal queries. It is, of course, not possible to describe every conceivable combination of elements and/or methods for purposes of describing the various features of this disclosure, but it can be recognize that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

The invention claimed is:
1. A method, comprising:
  generating, by a computing system having at least one processor, query data corresponding to a verbal query;
  determining, by the computing system, using multiple source data repositories, first product identifiers that match a searchable query corresponding to the verbal query;
  generating, by the computing system, product attribute data using unique second product identifiers contained in the first product identifiers, a portion of the product attribute data defining a group of features for a defined product identifier of the unique second product identifiers;

determining, by the computing system, third product identifiers by applying at least one filtering model to the unique second product identifiers;

generating, by the computing system, a ranking of the third product identifiers using an optimization function based on the query data and the product attribute data, wherein the generating comprises determining a solution to an optimization problem with respect to the optimization function, the solution results in the ranking of the third product identifiers; and selecting, by the computing system, a product corresponding to a product identifier having a defined placement in the ranking.

2. The method of claim 1, further comprising causing, by the computing system, presentation of response data identifying the product at an intelligent assistant device that received the verbal query, wherein the presentation includes delivery of an audible signal identifying the product.

3. The method of claim 2, further comprising:
determining, by the computing system, that the product is rejected at the intelligent assistant device; and
selecting, by the computing system, a second product corresponding to a second defined placement in the ranking.

4. The method of claim 1, wherein the query data comprise at least one of category data defining a category of products corresponding to the searchable query, brand data defining a product brand, or context data including one or more of first data identifying a shopping preference, second data identifying a location, or third data identifying a speaker identity corresponding to the verbal query.

5. The method of claim 1, further comprising determining the unique second product identifiers by removing duplicates from the first product identifiers prior to generating the product attribute data.

6. The method of claim 1, wherein the product attribute data comprise at least one of behavioral data pertaining to a user account corresponding to the verbal query, first personalized data identifying a brand preference, and second personalized data identifying a price preference.

7. The method of claim 1, wherein a first source data repository of the multiple source data repositories comprises data originated within a digital marketplace, and wherein a second source data repository of the multiple source data repositories comprises data originated externally relative to the digital marketplace.

8. The method of claim 1, wherein the applying comprises applying, to the second product identifiers, a combination of a first rule that excludes a product identifier corresponding to a product present in an exclusion list; a second rule that excludes a product identifier corresponding to a product having a defined price sharpness; a third rule that excludes a product identifier corresponding to a product noncompliant with an eligibility criterion; a fourth rule that excludes a product identifier corresponding to a product not in stock; or a fifth rule that excludes a product identifier corresponding to a product unrelated to a defined brand.

9. The method of claim 1, wherein the determining the first product identifiers comprises,
identifying, using the multiple data repositories, initial product identifiers that match the searchable query; and
identifying the first product identifiers by applying a first defined filtering model to the initial product identifiers.

10. The method of claim 1, further comprising:
receiving, by the computing system, a notification of a second verbal query prior to receiving second data defining the second verbal query;
receiving a directive to generate a second searchable query using the second verbal query; and
receiving a second directive to identify, using the multiple source data repositories, product identifiers that match the second searchable query.

11. A computing system, comprising:
at least one processor; and
at least one memory device having computer-executable instructions stored thereon that, in response to execution by the at least one processor, cause the computing system at least to:
generate query data using a searchable query corresponding to a verbal query;
determine, using multiple source data repositories, first product identifiers that match the searchable query;
determine second product identifiers by removing duplicates from the first product identifiers;
generate product attribute data using unique second product identifiers contained in the first product identifiers, a portion of the product attribute data defining a group of features for a defined product identifier of the second product identifiers;
generate a ranking of at least a subset of the unique second product identifiers using an optimization function based on the query data and the attribute data, wherein to generate the ranking comprises to determine a solution to an optimization problem with respect to the optimization function, the solution results in the ranking of the subset of the unique second product identifiers; and
select a product corresponding to a product identifier having a defined placement in the ranking.

12. The computing system of claim 11, the at least one memory device having further computer-executable instructions stored thereon that, in response to execution by the at least one processor, cause the computing system at least to cause presentation of response data identifying the product at an intelligent assistant device that received the verbal query, wherein the presentation includes delivery of an audible signal identifying the product.

13. The computing system of claim 12, the at least one memory device having further computer-executable instructions stored thereon that, in response to execution by the at least one processor, cause the computing system at least to:
determine that the product is rejected at the intelligent assistant device; and
select a second product corresponding to a second defined placement in the ranking.

14. The computing system of claim 11, the at least one memory device having further computer-executable instructions stored thereon that, in response to execution by the at least one processor, cause the computing system at least to determine the unique second product identifiers by removing duplicates from the first product identifiers prior to generating the product attribute data.

15. The computing system of claim 11, the at least one memory device having further computer-executable instructions stored thereon that, in response to execution by the at least one processor, cause the computing system at least to:
receive a notification of a second verbal query prior to receiving second data defining the second verbal query;
receive a directive to generate a second searchable query using the second verbal query; and
receive a second directive to identify, using the multiple source data repositories, product identifiers that match the second searchable query.

16. A device for responding to verbal queries, the device comprising storage coupled to at least one processor, the storage storing computer-executable instructions that, in response to execution by the at least one processor, cause the at least one processor to:
- generate query data using a searchable query corresponding to a verbal query;
- determine, using multiple source data repositories, first product identifiers that match the searchable query;
- determine second product identifiers by removing duplicates from the first product identifiers;
- generate product attribute data using unique second product identifiers contained in the first product identifiers, a portion of the product attribute data defining a group of features for a defined product identifier of the second product identifiers;
- generate a ranking of at least a subset of the unique second product identifiers using an optimization function based on the query data and the attribute data, wherein to generate the ranking comprises to determine a solution to an optimization problem with respect to the optimization function, the solution results in the ranking of the unique second product identifiers; and
- select a product corresponding to a product identifier having a defined placement in the ranking.

17. The device of claim 16, the storage storing further computer-executable instructions stored thereon that, in response to execution by the at least one processor, cause the device to cause presentation of response data identifying the product at an intelligent assistant device that received the verbal query, wherein the presentation includes delivery of an audible signal identifying the product.

18. The device of claim 17, the storage storing further computer-executable instructions stored thereon that, in response to execution by the at least one processor, cause the device to:
- determine that the product is rejected at the intelligent assistant device; and
- select a second product corresponding to a second defined placement in the ranking.

19. The device of claim 16, the storage storing further computer-executable instructions stored thereon that, in response to execution by the at least one processor, cause the device to determine the unique second product identifiers by removing duplicates from the first product identifiers prior to generating the product attribute data.

* * * * *